| United States Patent [19] | [11] 3,875,001 |
|---|---|
| Kubota et al. | [45] Apr. 1, 1975 |

[54] FERMENTATIVE PRODUCTION OF L-HISTIDINE

[75] Inventors: Koji Kubota; Hirotaka Kamijo; Osamu Mihara, all of Kawasaki; Shinji Okumura; Hiroshi Okada, both of Tokyo, all of Japan

[73] Assignee: Ajinomoto Co., Inc., Tokyo, Japan

[22] Filed: Aug. 20, 1973

[21] Appl. No.: 389,790

[30] Foreign Application Priority Data
Aug. 25, 1972 Japan.............................. 47-85715

[52] U.S. Cl...................... 195/29, 195/28, 195/30, 195/47
[51] Int. Cl............................................. C12d 13/06
[58] Field of Search................ 195/28 R, 29, 30, 47

[56] References Cited
UNITED STATES PATENTS
3,716,453   2/1973   Okumura et al..................... 195/29

*Primary Examiner*—Lionel M. Shapiro
*Assistant Examiner*—Robert J. Warden
*Attorney, Agent, or Firm*—Hans Berman

[57] ABSTRACT

Mutant strains of Brevibacterium flavum, Brevibacterium lactofermentum, and Corynebacterium acetoacidophilum which resist 2-thiazole alanine and require arginine, methionine, tryptophan, leucine, phenylalanine, lysine, threonine, uracil, xanthine, and/or shikimic acid for their growth produce much more histidine by fermentation of otherwise conventional culture media than closely related strains not requiring such specific organic nutrients.

4 Claims, No Drawings

FERMENTATIVE PRODUCTION OF L-HISTIDINE

This invention relates to the production of L-histidine, hereinafter referred to as histidine for the sake of brevity, by fermentation, and particularly to an improvement over the method of the commonly owned U.S. Pat. No. 3,716,453.

Several of us had disclosed in the earlier patent that histidine can be produced by fermentation of conventional culture media by microorganisms of the genera Brevibacterium, Corynebacterium, and Arthrobacter which are artificially induced mutants of parent strains incapable of producing histidine under the same conditions, the mutants being resistant to 2-thiazole alanine concentrations of more than 1 mg per milliliter of culture medium.

It has now been found that other mutants belonging to the genera Brevibacterium and Corynebacterium which combine resistance to 2-thiazole alanine with specific nutrient requirements are substantially superior to the microorganisms of the earlier patent in their ability of producing histidine by fermentation. The required nutrients are arginine, methionine, tryptophan, leucine, phenylalanine, lysine, threonine, xanthine, uracil, and/or shikimic acid.

The mutants of the instant invention are produced from the respective parent strains by conventional methods partly described in the earlier patent, as by exposure of the parent strain to ionizing radiation (ultraviolet, X-rays, gamma rays) or to chemical mutagenic agents (sodium nitrite, nitrosoguanidine, diethyl sulfate). Typically exposure to 250 µg/ml nitrosoguanidine at 30°C for 30 minutes will have the desired effect.

The mutants produced are inoculated on an otherwise conventional culture medium containing enough 2-thiazole alanine for suppressing the growth of the parent strain. This requires generally more than 1 mg/ml 2-thiazole alanine, and the best histidine producing strains can grow on media containing 5 mg 2-thiazole alanine per milliliter. The resistant strains are collected and may be subjected to yet another treatment with mutagenic agents. The strains requiring the specific nutrients listed above are then selected from the first or second generation of mutants in a conventional manner.

They all produce histidine by aerobic fermentation of conventional aqueous culture media containing assimilable sources of carbon and nitrogen, and minor amounts of inorganic salts and organic nutrients including the specific required substance or substances.

The best histidine-producing strains available to us at this time are listed below with their accession numbers (FERM-P) of the Fermentation Research Institute, Agency of Industrial Science and Technology, at Inage, Chiba-shi, Japan and their specific nutrients in parentheses. They were derived from *B. flavum* ATCC 14067, *B. lactofermentum* ATCC 13869, and *C. acetoacidophilum* ATCC 13870.

Suitable carbon sources for the fermentation media include carbohydrates (glucose, sucrose, starch hydrolyzate, molasses, starch), organic acids (acetic, fumaric, benzoic, lactic, gluconic acid and fatty acids), and alcohols (ethanol, propanol, butanol, glycerol, sorbitol, mannitol).

For a good yield of histidine, the fermentation is carried out aerobically with aeration and agitation. Best yields require a pH controlled within the range from 5 to 9, and the desired pH may be maintained by means of gaseous or aqueous ammonia, calcium carbonate, alkali metal hydroxide, urea, organic or inorganic acids, and some of these addition agents may also provide the necessary nitrogen supply. When the fermentation is carried out at 25° to 37°C, the histidine concentration in the broth reaches a maximum within two to seven days.

The histidine may be recovered from the culture medium by ion exchange resin treatment as described in the aforementioned patent which also described the known methods for identifying and quantitatively determining the product.

The following Examples further illustrate this invention.

EXAMPLE 1

*Brevibacterium flavum* FERM-P 1561 was cultured on bouillon agar slants. An aqueous fermentation medium containing, per deciliter, 10 g glucose, 5 g $(NH_4)_2SO_4$, 0.1 g $KH_2PO_4$, 0.04 g $MgSO_4.7H_2O$, 0.2 mg $Fe^{++}$, 0.2 mg $Mn^{++}$, 50 µg biotin, 5.0 µg thiamine.HCl, 0.3 ml soy protein hydrolyzate, 50 mg arginine, and 5 g $CaCO_3$, was adjusted to pH 7.5, 20 ml batches of the medium were transferred to respective 500 ml shaking flasks, sterilized with steam, and thereafter inoculated with the microorganisms. Each culture medium was shaken for 72 hours at 31°C, and the combined broths then were found to contain 1.11 g/dl distidine.

The microbial cells were removed from one liter of the broth by centrifuging, and the supernatant was stripped of histidine by passage over a column of the strongly acidic ion exchange resin Amberlite IR-120 (H-type). The column was washed, and the histidine thereafter eluted with 3% ammonium hydroxide solution. The eluate was partly evaporated in a vacuum, and histidine crystallized from the concentrate was recovered in an amount of 7.3 g.

In a comparison test, *B.flavum* ATCC 21406 was cultured on the same fermentation medium under the same conditions, and a histidine concentration of 0.40 g/dl was reached in good agreement with Example 1 of the earlier patent.

EXAMPLE 2

The microorganism strains identified above by accession numbers FERM-P 1562 to 1569 and 2168 to 2170 were cultured on respective fermentation media identi-

| *Brevibacterium flavum* | *Brevibacterium lactofermentum* |
|---|---|
| FERM-P 1561 (arginine) | FERM-P 1565 (leucine) |
| FERM-P 1562 (methionine) | FERM-P 1566 (leucine and tryptophan) |
| FERM-P 1563 (tryptophan) | FERM-P 1567 (leucine and phenylalanine) |
| FERM-P 1564 (uracil) | FERM-P 1568 (phenylalanine) |
| FERM-P 2168 (shikimic acid) | *Corynebacterium acetoacidophilum* |
| FERM-P 2169 (xanthine) | FERM-P 1569 (lysine) |
| FERM-P 2170 (threonine) | | cal with the medium of Example 1 in their contents of glucose, monopotassium phosphate, magnesium sulfate, ferrous and manganous ions, thiamine hydrochloride, and calcium carbonate, under the same general conditions. The several media differed in their initial concentrations of biotin, ammonium sulfate, and soy protein hydrolyzate, as listed in Table 1, and partly contained additional organic nutrients, abbreviated in Table 1 as meth. (methionine), try. (tryptophan), ur. (uracil), lys. (lysine hydrochloride), shik. (shikimic acid), xan. (xanthine), and thre. (threonine). The amounts of histidine accumulated in each medium are also listed.

TABLE 1

| Strain FERM-P | Biot. μg/l | Amm.sulf. g/dl | Soy.prot. hydr.,g/dl | Nutrient mg/dl | Histid. g/dl |
|---|---|---|---|---|---|
| 1562 | 500 | 5 | 0.3 | meth. 30 | 1.08 |
| 1563 | 500 | 5 | 0.3 | try. 50 | 1.02 |
| 1564 | 500 | 5 | 0.3 | ur. 50 | 1.10 |
| 1565 | 50 | 3 | 2.0 | — | 0.86 |
| 1566 | 50 | 3 | 2.0 | try. 30 | 1.04 |
| 1567 | 50 | 3 | 2.0 | — | 0.99 |
| 1568 | 50 | 3 | 2.0 | — | 1.05 |
| 1569 | 500 | 5 | 0.3 | lys. 30 | 0.52 |
| 2168 | 500 | 5 | 0.3 | shik. 40 | 0.92 |
| 2169 | 500 | 5 | 0.3 | xan. 15 | 0.85 |
| 2170 | 500 | 5 | 0.3 | thre. 50 | 1.00 |

EXAMPLE 3

The strains of microorganisms identified above by their accession numbers FERM-P 1561 to 1569 were cultured at 31°C for 20 hours in a culture medium containing, per deciliter, 3 g glucose, 0.3 g ammonium acetate, 0.2 g urea, 0.1 g KH$_2$PO$_4$, 40 mg MgSO$_4$.7H$_2$O, 0.2 mg Fe$^{++}$, 0.2 mg Mn$^{++}$, 10 μg biotin, 20 μg thiamine.HCl, 2 ml soy protein hydrolyzate, and 0.5 g yeast extract, and ajusted to pH 7.5.

An aqueous fermentation medium was prepared to contain, per deciliter, 3 g glucose, 0.5 g ammonium acetate, 0.2 g urea, 0.1 g KH$_2$PO$_4$, 0.04 g MgSO$_4$.7H$_2$O, 0.2 mg Fe$^{++}$, 0.2 mg Mn$^{++}$, 10 μg biotin, 5 μg thiamine.HCl, 0.5 corn steep liquor, 2 ml soy protein hydrolyzate, and adjusted to pH 7.2. 300 Ml batches of the fermentation medium were placed in respective one liter fermentation vessels, further mixed with the nutrients required by the strains, as indicated in Examples 1 and 2, sterilized, inoculated with 15 ml portions of the seed cultures mentioned above, and held at 31°C with aeration at a rate of 300 ml/min. and agitation at 1500 RPM.

A solution containing acetic acid and ammonium acetate in a mole ratio of 4:1 and a total of 60 g/dl acetate ion was added to each fermentation mixture at a rate to maintain a pH of 7.2 to 8.0 without exceeding an acetic acid concentration of 1.5%.

The histidine concentration was determined in each fermentation medium after 50 hours. In the cultures of B. flavum FERM-P 1561 to 1564 the respective histidine concentrations were, in the same order, 0.92, 0.93, 0.88, and 1.06 g/dl. B.lactofermentum FERM-P 1565 to 1568 correspondingly produced 0.93, 0.77, 0.95, and 1.02 g/dl histidine. The broth of C. acetoacidophilum FERM-P 1569 contained 0.49 g/dl histidine.

For comparison purposes, analogous fermentation tests were performed with B.flavum ATCC 21406 and C.acetoacidophilum ATCC 21407, and 0.38 and 0.18 g/dl histidine were found in the respective broths after 50 hours. The two last-mentioned microorganism strains are known from the earlier patent. They resist 2-thiazole alanine, but lack specific nutrient requirements.

EXAMPLE 4

Inocula of the eleven microorganisms mentioned in Example 3 were prepared as in the preceding Example on a medium containing an additional 0.1 g/dl urea instead of the ammonium sulfate.

The basic fermentation medium employed contained, per deciliter, 1 g glucose, 1.5 g ethanol, 0.5 g ammonium sulfate, 0.2 g urea, 0.1 g KH$_2$PO$_4$, 0.04 g MgSO$_4$.7H$_2$O, 0.2 mg each Fe$^{++}$ and Mn$^{++}$, 10 μg biotin, 5.0 μg thiamine. HCl, 2 ml soy protein hydrolyzate, and 0.5 ml corn steep liquor, and had a pH of 7.2. 300 ml batches of the fermentation medium were mixed with the specific nutrients as indicated in Examples 1 and 2, sterilized with steam in one liter fermentation vessels, inoculated with 15 ml of the respective cultures, and held at 31°C with aeration at 300 ml/min and agitation at 1,500 RPM. Gaseous ammonia was fed to each fermentation mixture at a rate to hold the pH between 7.0 and 7.5 while ethanol was supplied to maintain a concentration of 0.3 g/dl.

After 48 hours, the eleven broths were analyzed for histidine content. The nine microorganisms of this invention produced, in order of increasing FERM-P numbers 0.79, 0.70, 0.73, 0.84, 0.81, 0.66, 0.78, 0.85, and 0.40 g/dl histidine, whereas the broths of the two control strains respectively contained 0.28 and 0.15 g/dl histidine.

What is claimed is:

1. A method of producing L-histidine which comprises
   a. culturing a strain of Brevibacterium or Corynebacterium under aerobic conditions in an aqueous medium containing sources of assimilable carbon and nitrogen and minor amounts of inorganic salts and organic nutrients necessary for the growth of said strain until histidine accumulates in said medium,
      1. said strain being an artificially induced mutant capable of growing on a medium containing more than 1 mg 2-thiazole alanine per milliliter, and requiring for growth at least one organic nutrient selected from the group consisting of arginine, methionine, tryptophane, leucine, phenylalanine, lysine, threonine, uracil, xanthine, and shikimic acid; and
   b. recovering the accumulated histidine from said medium.

2. A method as set forth in claim 1, wherein said strain is *Brevibacterium flavum* FERM-P 1561, FERM-P 1562, FERM-P 1563, FERM-P 1564, *Brevibacterium lactofermentum* FERM-P 1565, FERM-P 1566, FERM-P 1567, FERM-P 1568, or *Corynebacterium acetoacidophilum* FERM-P 1569.

3. A method as set forth in claim 1, wherein said strain is *Brevibacterium flavum* FERM-P 2168, 2169 or FERM-P 2170.

4. A method as set forth in claim 1, wherein said strain is a strain of *Brevibacterium flavum*.

* * * * *